United States Patent
Liang et al.

(10) Patent No.: US 11,199,734 B2
(45) Date of Patent: Dec. 14, 2021

(54) IMAGE ADJUSTMENT DEVICE FOR A DISPLAY COMPRISING A DUTY CYCLE CALCULATOR CONFIGURED TO RECEIVE AN INPUT IMAGE AND AN INTENSITY CALCULATOR CONFIGURED TO CALCULATE A PIXEL INTENSITY AND IMAGE ADJUSTMENT METHOD

(71) Applicant: Novatek Microelectronics Corp., Hsinchu (TW)

(72) Inventors: JianHua Liang, ShaanXi Province (CN); Xiao Zhang, ShaanXi Province (CN); Qiqiang Han, Shaanxi (CN)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/903,386

(22) Filed: Jun. 17, 2020

(65) Prior Publication Data
US 2020/0400984 A1 Dec. 24, 2020

Related U.S. Application Data

(60) Provisional application No. 62/863,880, filed on Jun. 20, 2019.

(51) Int. Cl.
*G02F 1/133* (2006.01)
*G02F 1/13357* (2006.01)
*G02F 1/1335* (2006.01)

(52) U.S. Cl.
CPC .... *G02F 1/13306* (2013.01); *G02F 1/133504* (2013.01); *G02F 1/133606* (2013.01); *G02F 1/133626* (2021.01)

(58) Field of Classification Search
CPC ........ G02F 1/133626; G09G 2320/046; G09G 2320/02
See application file for complete search history.

(56) References Cited

U.S. PATENT DOCUMENTS

2009/0091528 A1 * 4/2009 Hong ................... G09G 3/3406
345/102
2010/0123742 A1 * 5/2010 Jang ..................... G09G 3/3426
345/690

(Continued)

FOREIGN PATENT DOCUMENTS

CN 103033982 A * 4/2013 ........... H04N 13/361
CN 104280928 A * 1/2015 ....... G02F 1/133555

*Primary Examiner* — Paul C Lee
(74) *Attorney, Agent, or Firm* — JCIPRNET

(57) ABSTRACT

The disclosure provides an image adjustment device configured to be different modes according to whether the adopted display is a light emitting diode display or a liquid crystal display, and including a duty cycle calculator, an intensity calculator and a compensator. In a first mode, the duty cycle calculator determines a respective type of each segment according to brightness information of each segment, and sets a duty cycle value according to the type of the segment. In a second mode, the duty cycle calculator calculates the duty cycle value according to the brightness information of each segment. The intensity calculator calculates the pixel intensity of the segment based on the duty cycle value and a light diffusion coefficient set. The compensator generates a pixel gain value according to the intensity value of each pixel of the segment, and adjusts the pixel value according to the pixel gain value.

20 Claims, 6 Drawing Sheets

(56) References Cited

U.S. PATENT DOCUMENTS

2013/0285995 A1* 10/2013 Zhou .................... G09G 3/3406
  345/211
2016/0248991 A1*  8/2016 Matsumoto ............. G06T 5/008
2018/0301116 A1* 10/2018 Harada ................ G09G 3/3413

* cited by examiner

IMAGE ADJUSTMENT DEVICE FOR A DISPLAY COMPRISING A DUTY CYCLE CALCULATOR CONFIGURED TO RECEIVE AN INPUT IMAGE AND AN INTENSITY CALCULATOR CONFIGURED TO CALCULATE A PIXEL INTENSITY AND IMAGE ADJUSTMENT METHOD

CROSS-REFERENCE TO RELATED APPLICATION

This application claims the priority benefit of U.S. provisional application Ser. No. 62/863,880, filed on Jun. 20, 2019. The entirety of the above-mentioned patent application is hereby incorporated by reference herein and made a part of this specification.

BACKGROUND

Field of the Disclosure

The disclosure relates to an image adjustment device, and in particular to an image adjustment device commonly used for light-emitting diode (LED) displays and liquid crystal displays.

Description of Related Art

Liquid-Crystal Display (LCD) and Organic Light-Emitting Diode (OLED) displays are the current mainstream displays. However, these two displays have their own drawbacks.

The contrast of picture shown by LCD display is incomparable with OLED displays. Typically, a person skilled in the art adjusts the local backlight brightness of the display picture through the local dimming technology, thereby improving the contrast of the display picture and generating a better image.

OLED displays have the problem of image sticking. Image sticking is an irreversible phenomenon caused by aging of light-emitting elements of OLED displays. When the OLED display continuously displays a certain picture, the aging degree of the light-emitting element corresponding to the high-brightness area in the picture will be higher than that of other areas. The brightness of the light-emitting elements that age faster becomes lower, and eventually the burn-in (commonly known as "sticking") is formed on the screen. Briefly, sticking is generated due to the uneven ageing of the light-emitting elements of the screen, which results in the phenomenon of image sticking that appears when displaying uniform picture content. To alleviate or even prevent the problem of image sticking, chips of OLED display are designed with relevant algorithms to execute the corresponding technology, wherein adaptive luminance reduction technology is the most common one.

Since the working principles and shortcomings of LCD and OLED displays are different, it is necessary to design the functional modules of the chip for LCD and OLED displays respectively. In other words, the chips of LCD and OLED displays are basically not interchangeable.

SUMMARY OF THE DISCLOSURE

The disclosure provides an image adjustment device and an image adjustment method, which can perform different dimming processes according to the type of the display that is adopted.

The image adjustment device of the disclosure is adaptable for a display, and is configured to be in the first mode or the second mode depending on whether the display is a light emitting diode (LCD) display or a liquid crystal display. The image adjustment device includes a duty cycle calculator, an intensity calculator, and a compensator. The duty cycle calculator is configured to receive an input image having a plurality of segments. In the first mode, the duty cycle calculator determines whether each of the segments is a first-type segment or a second-type segment according to the brightness information of each of the segments, and sets the duty cycle value of each of the segments according to the respective type of the segments, wherein the first-type segment has higher risk of sticking than the second-type segment. In the second mode, the duty cycle calculator calculates the duty cycle value of each of the segments according to the brightness information of each of the segments. The intensity calculator is coupled to the duty cycle calculator and configured to calculate a pixel intensity of each of the segments according to the duty cycle value of each of the segments and a light diffusion coefficient set. The compensator is coupled to the intensity calculator, and configured to generate a pixel gain value according to a pixel intensity value of each pixel of pixels in the segments, and adjust pixel values of the pixels according the pixel gain values.

The image adjustment device adaptable for a display in the disclosure includes an image detector, a duty cycle setting device, an intensity calculator, and a compensator. The image detector is configured to receive an input image having a plurality of segments, and determines whether each of the segments is a first-type segment or a second-type segment according to the brightness information of each of the segments, wherein the first-type segment has higher risk of sticking than the second-type segment. The duty cycle setting device is coupled to the image detector, and configured to set the duty cycle value of each of the segments in the first mode according to the respective type of the segments. The intensity calculator is coupled to the duty cycle setting device and configured to calculate a pixel intensity of each of the segments according to the duty cycle value of each of the segments and a light diffusion coefficient set. The compensator is coupled to the intensity calculator, and configured to generate a pixel gain value according to a pixel intensity value of each pixel of pixels in the segments, and adjust pixel values of the pixels according the pixel gain values.

The image adjustment device adaptable for a display in the disclosure is in the first mode or the second mode depending on whether the display is a LCD display or a liquid crystal display. The image adjustment device includes a register circuit and a local dimming module. The register circuit is configured to set the operation mode of the image adjustment device to one of the first mode and the second mode. The local dimming module is configured to perform local dimming processing based on the input image including a plurality of segments, and calculate the duty cycle value of each of the segments according to the pixel values of the segments, thereby compensating for the pixel value of each of the segments according to the duty cycle value of the segments and the light diffusion coefficient set. Specifically, in the first mode, the duty cycle value is a virtual duty cycle value, and the light diffusion coefficient set is a simulated light diffusion coefficient set. In the second mode, the duty cycle value is the realistic duty cycle value for controlling the backlight device of the liquid crystal display, and the light diffusion coefficient set is a measured light diffusion coefficient set.

Based on the above, the image adjustment device of the disclosure can select whether to be in the first mode or the second mode depending on the type of display that is applied. The image adjustment device executes multiple modules with different paths in the first mode and the second mode, respectively, so that the pixel value of the pixel of each of the segments of the input image are compensated. By compensating pixels, the image adjustment device can exert the effect of local dimming. Since the image adjustment device can be commonly adopted for different types of displays, the manufacturing cost for display chip can be reduced.

In order to make the above features and advantages of the present disclosure more comprehensible, embodiments are described below in detail with the accompanying drawings as follows.

DESCRIPTION OF EMBODIMENTS

Figure 1:
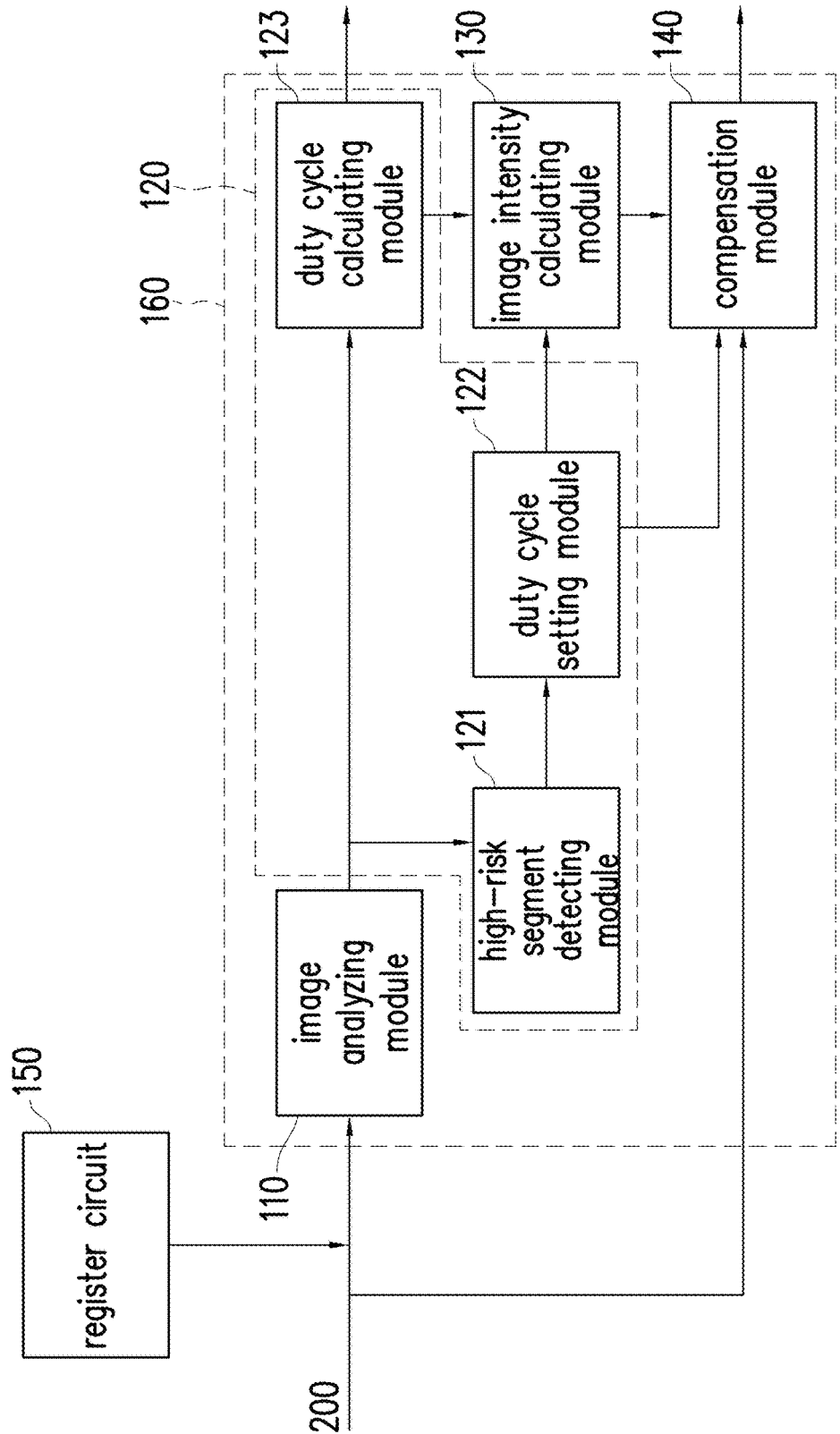
FIG. 1 is a schematic block view of an image adjustment device of the disclosure.

FIG. 1 is a schematic block view of an image adjustment device of the disclosure. The image adjustment device 100 may be disposed on the display chip and become a part of the display chip. The chip having the image adjustment device 100 can be commonly adopted for two different displays, e.g., LCD and OLED displays. The embodiment is explained with LCD and OLED displays but the disclosure is not limited thereto. The image adjustment device 100 can be configured to be in a first mode or a second mode according to whether the display is an LCD or an OLED display. The image adjustment device 100 may include a register circuit 150 for setting whether the image adjustment device 100 is in the first mode or the second mode.

The image adjustment device 100 may include a local dimming module 160 coupled to the register circuit, configured to perform a local dimming process based on an input image comprising a plurality of segments, by calculating a duty cycle value of each of the segments according to pixel values of the segments to compensate the pixel values of each of the segments according to the duty cycle values of the segments and a light diffusion coefficient set.

When the chip is applied to the OLED display, the image adjustment device 100 is in the first mode. In the first mode, the duty cycle value is a virtual duty cycle value, and the light diffusion coefficient set is a simulated light diffusion coefficient set.

When the chip is applied to the LCD, the image adjustment device 100 is in the second mode. In the second mode, the duty cycle value is a realistic duty cycle value for controlling a backlight device of the liquid crystal display, and the light diffusion coefficient set is a measured light diffusion coefficient set.

In the embodiments, one or more modules can be shared in the first and second modes to reduce cost. In other words, the image adjustment device 100, capable of preventing image sticking on the OLED display and dimming a backlight of the LCD panel, can be implemented with low cost by one or more modules commonly adopted in the two modes. For example, local and global information can be used for duty decision on the LCD and be used for detect dangerous areas where the image sticking may happen in future. In addition, a same compensation module could be used to keep the luminance on LCD and be adopted to reduce the local or global stress exposed to the pixels by lowering the pixel value in OLED displays. Accordingly, the chip 100 can be used in OLED displays with the image sticking protection function, and be used in LCDs with backlight dimming function.

Please refer to FIG. 1, which also illustrates a detailed architecture of the local dimming module 160 according to an embodiment. As shown, the local dimming module 160 includes an image analyzing module 110, a duty cycle calculator 120, a pixel intensity calculating module 130 and a compensation module 140. In some implementations, the duty cycle calculator 120 can further include a high-risk segment detecting module 121, a duty cycle setting module 122 and a duty cycle calculating module 123.

Among the local dimming module 160 including the multiple functional modules of the image adjustment device 100, different modules can be commonly adopted (i.e., shared) in the first mode and the second mode. For example, the image analyzing module 110, the pixel intensity calculating module 130, and the compensation module 140 are commonly adopted. The high-risk segment detecting module 121 and the duty cycle setting module 122 can be disposed for OLED display. The duty cycle calculating module 123 is disposed for LCD. When the chip is applied to the OLED display, the image adjustment device 100 is in the first mode. The image adjustment device 100 in the first mode, by means of disabling the duty cycle calculating module 123, for example, allows the image adjustment device 100 to perform function only with the image analyzing module 110, the high-risk segment detecting module 121, the duty cycle setting module 122, the pixel intensity calculating module 130 and the compensation module 140. When the chip is applied to the LCD, the image adjustment device 100 is in the second mode. The image adjustment device 100 in the second mode, by means of disabling the high-risk segment detecting module 121 and the duty cycle setting module 122, for example, allows the image adjustment device 100 to perform function only with the image analyzing module 110, the duty cycle calculating module 123, the pixel intensity calculating module 130 and the compensation module 140. The multiple modules included in the image adjustment device 100 may be implemented by a circuit designed in a hardware description language (HDL), wherein the hardware description language may be Verilog.

The image analyzing module 110 and the compensation module 140 may operate in substantially the same manner in the first mode and the second mode. The pixel intensity calculating module 130 may perform the same function using different backlight profiles. For example, the pixel intensity calculate module 130 can use the simulated light diffusion coefficient set in the first mode and use the measured light diffusion coefficient set in the second mode. In addition, in the first mode, the duty cycle value is a virtual duty cycle value, and in the second mode, the duty cycle value is a realistic duty cycle value for controlling a backlight device of the LCD.

Figure 2:
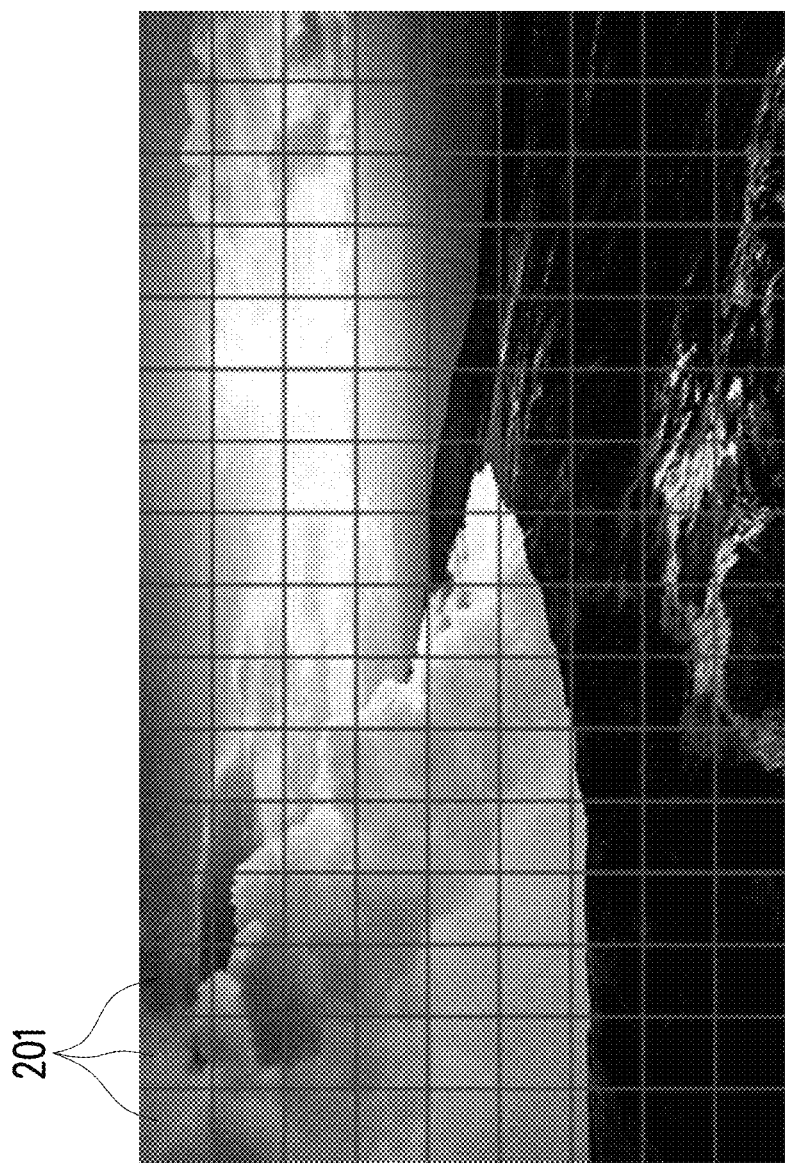
FIG. 2 is a schematic view of an input image having multiple segments according to the disclosure.

The image analyzing module 110 is configured to receive an input image and divide the input image into a plurality of segments. FIG. 2 is a schematic view of an input image having the plurality of segments according to the disclosure. Please refer to FIG. 1 and FIG. 2 both, the image analyzing module 110 can divide the input image 200 into a plurality of segments 201, wherein each of the segments includes a plurality of pixels, and each pixel information for each pixel includes a plurality of sub-pixel information. For example, each pixel information may include three sub-pixel information, respectively corresponding to red, green and blue sub-pixel information. The size of the segments 201 can be set according to the actual needs of the designer. The image analyzing module 110 can also calculate the average picture level (APL) value and the maximum pixel level value of the plurality of pixel information corresponding to each of the segments 201. In other embodiments, the image analyzing module 110 can also calculate a histogram of the input image 200. The calculation methods of the APL value, the maximum pixel level value and the histogram are commonly known to those skilled in the art, such methods will not be repeated here. Accordingly, the image analyzing module 110 can calculate global information (e.g., average picture level, global histogram) or can divide the input image 200 into segments and calculate local information (e.g., average and maximum value) for each segment.

The high-risk segment detecting module 110 is coupled to the image analyzing module 110, configured to, under the first mode when the chip is applied to the OLED display, receive the input image 200 including the plurality of segments 201 and determine whether each of the segments 201 is a first-type segment or a second-type segment based on the brightness information of each of the segments 201. When the image information corresponding to a segment is maintained at a high brightness for a sufficiently long time, the segment can be determined to be the first-type segment.

In an embodiment, the high-risk segment detecting module 110 may calculate the sum of the average picture level of each of the segments 201 in one or more previous frames and the average picture level (APL) of the current frame, and compare the aforementioned sum with a first threshold. When the aforementioned sum is greater than the first threshold, the high-risk segment detecting module 110 determines that the corresponding segment 201 is a first-type segment. When the aforementioned sum is less than or equal to the first threshold, the high-risk segment detecting module 110 determines that the corresponding segment 201 is a second-type segment. When the image information corresponding to the segments 201 is maintained at a high brightness for a long time, the aforementioned sum may be greater than the first threshold, so that the corresponding segments 201 are determined to be the first-type segments.

The picture displayed in the first-type segments is, for example, a light source area in a static image, or for example, a virtual Home button on a mobile phone screen. Therefore, the first-type segments have a higher risk of sticking than the second-type segments. It should be noted that the disclosure provides no limitation to the previous frames used for calculation. In other embodiments, the number of previous frames may be multiple.

The duty cycle setting module 122 is coupled to the high-risk segment detecting module 121, and is configured to, under the first mode when the chip is applied to the OLED display, set a target duty cycle value and set the duty cycle value of each of the segments 201 according to the type of the segments 201. In the first mode, the duty cycle value is a virtual duty cycle value not for controlling a backlight device because the OLED does not have a backlight device. The target duty cycle value can be used by the compensation module 140 for compensating the pixel values of multiple pixels in each of the segments. The duty cycle value is not for setting the duty cycles for the OLED display without backlights but can be used by the image intensity calculating module 130 for calculating pixel intensity values, which can be further used along with the target duty cycle value by the compensation module 140 for compensating the pixel values of multiple pixels in each of the segments.

Figure 3:
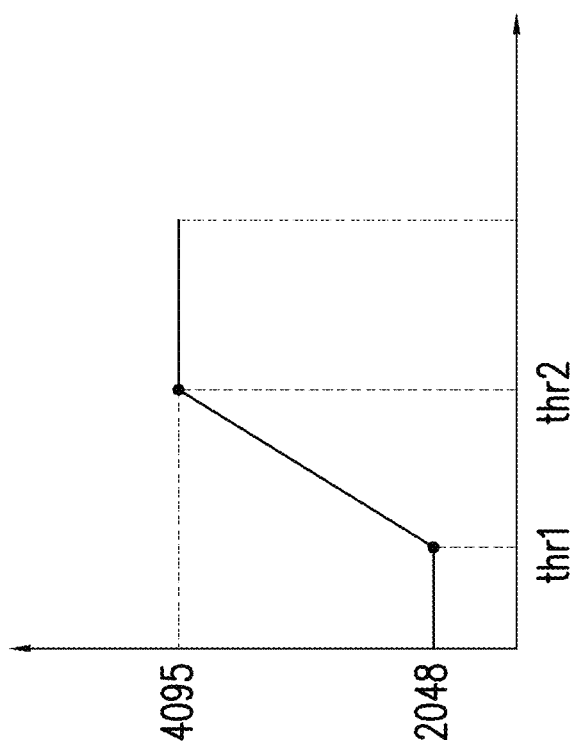
FIG. 3 is a curve graph showing the relationship between the sum of average picture levels and duty cycle value according to an embodiment of the disclosure.

FIG. 3 is a curve graph showing the relationship between the sum of average picture levels and duty cycle value according to an embodiment of the disclosure. The horizontal axis of this relationship curve graph represents the sum (hereinafter referred to as "sum") of the average picture level of the segments in the previous frame and the average picture level of the segments in the current frame, and the vertical axis represents the duty cycle value of the segments.

Please refer to FIG. 3, when the sum of the segments is greater than the first threshold thr1, it means that the segments are the first-type segments. The duty cycle setting module 122 may set the target duty cycle to a preset value, which may be 2048, lower than the maximum value of the duty cycle value. The duty cycle setting module 122 may set the duty cycle value of the second-type segments of which the sum is less than or equal to the first threshold thr1 to a first value equal to the target duty cycle value, e.g., 2048. As will explained, this can lead a pixel gain value for the second-type segments to be equal to 1. For the first-type segments, the duty cycle setting module 122 may set the duty cycle value of the first-type segments of which the sum is greater than the first threshold thr1 to be greater than the target duty cycle value (i.e., 2048), which can be from 2048 to the maximum value (i.e., 4095).

In more detail, for example, the duty cycle setting module 122 may set the duty cycle value of the first-type segments of which the sum is greater than a second threshold thr2 to be equal to the target duty cycle value, which can be the maximum value, that is, 4095. For the segments of which the sum is between the first threshold thr1 and the second threshold thr2, the duty cycle setting module 122 sets the duty cycle value of the segments according to a linear ratio. Specifically, the duty cycle setting module 122 may set the duty cycle value of the first-type segments according to the difference between the sum and the first threshold thr1.

The duty cycle calculating module 123 is coupled to the image analyzing module 110 for, under the second mode when the chip is applied to the LCD display, setting a target duty cycle value, and calculating the duty cycle value of each of the segments according to the brightness information (such as the maximum pixel level value and APL value of each of the segments) of each of the segments. In the second mode, the duty cycle value is a realistic duty cycle value for controlling a backlight device of the LCD.

In an embodiment, the duty cycle calculating module 123 can calculate the duty cycle value of each of the segments according to the following formula (1). In formula (1), $r_k$ represents the duty cycle value of the Kth segment, $Max_k$ represents the maximum pixel level value of the Kth segment, and $APL_k$ represents the APL value of the Kth segment, wherein K is a positive integer, and a is an adjustment coefficient and its value is between 0 and 1 (which can be set according to the actual needs of the designer). Briefly, the duty cycle calculating module 123 may add up the maximum pixel level value of the first ratio of each of the segments and the second ratio APL value, and use the summed value as the duty cycle value of the corresponding segment, wherein the sum of the first ratio and the second ratio is 1. In addition, the duty cycle calculating module 123 may set the target duty cycle to the maximum value of the duty cycle value (i.e., 4095).

$$r_k = MAX_k * \alpha + APL_k * (1-\alpha) \quad \text{formula (1)}$$

Figure 4:
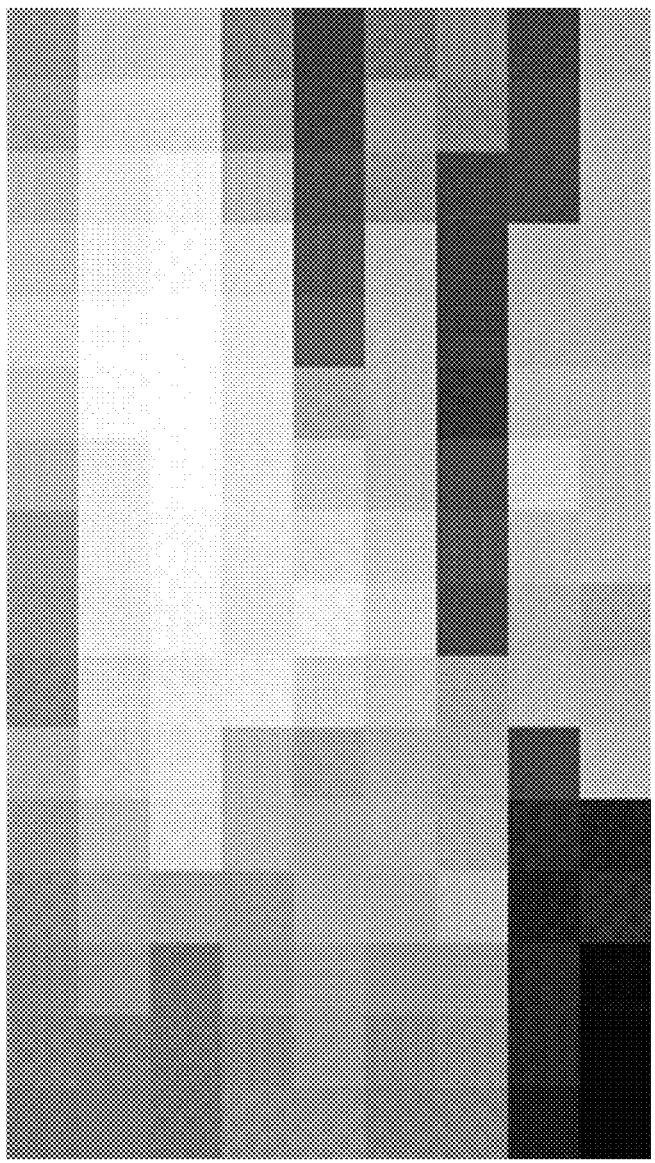
FIG. 4 is a schematic view showing the calculation result of the duty cycle calculating module of the disclosure.

FIG. 4 is a schematic view showing the calculation result of the duty cycle calculating module of the disclosure. Please refer to FIG. 2 and FIG. 4 both, the duty cycle calculating module 123 can calculate the duty cycle value of each of the segments 201 according to the brightness information of each of the segments 201, so as to generate a set 400 of duty cycle values of multiple segments as shown in FIG. 4.

The pixel intensity calculating module 130 is coupled to the duty cycle setting module 122 in the first mode and coupled to the duty cycle calculating module 123 in the second mode, and is configured to calculate the pixel intensity of the pixel in each of the segments according to the duty cycle value of each of the segments and the light diffusion coefficient set. In this embodiment, the pixel intensity calculating module 130 may calculate the pixel intensity of the pixel in each of the segments according to the following formula (2).

$$\text{Pix\_intensity} = SUM(r_1 * coef1 + r_2 * coef2 + \ldots + r_M * coefM)/\text{PROFILE\_SUM} \quad \text{formula (2)}$$

In formula (2), pix_intensity represents the pixel intensity of the pixel to be measured, and SUM represents the summation operation. Incidentally, in FIG. 4, the higher the gray scale value (the display result is close to white), the higher the intensity of the segment. r1, r2, . . . , $r_M$ respectively represent the duty cycle values of M pixels including the pixel to be measured. {Coef1, Coef2, . . . , CoefM} is referred to as a light diffusion coefficient set, representing the degree of influence of the LED lights of M pixels including the pixel to be measured on the brightness of the pixel to be measured. Each element in the light diffusion coefficient set is referred to as the light diffusion coefficient.

The pixel intensity calculate module 130 can use the simulated light diffusion coefficient set in the first mode and use the measured light diffusion coefficient set in the second mode. More specifically, in the first mode, the light diffusion coefficient set may be obtained by analogizing or simulating the position information of the light source by Gaussian function. In the second mode, the light diffusion coefficient set may be obtained by photographing the diffusion condition of the backlight(s). The value of Profile_SUM is equivalent to coef1+coef2+ . . . coefM. Also, M in formula (2) is a positive integer.

The compensation module 140 is coupled to the duty cycle setting module 122 and the pixel intensity calculating module 130 both, and is configured to generate a pixel gain value according to the pixel intensity value of each of the pixels in the plurality of pixels of the segments and the target duty cycle value, and adjust the pixel value of corresponding pixel according to the pixel gain value. In this embodiment, the compensation module 140 may calculate the pixel gain value according to the following formula (3), wherein Gain represents the pixel gain value, target represents the target duty cycle value, and pix_intensity represents the pixel intensity.

$$\text{Gain} = \text{target}/\text{pix\_intensity} \quad \text{formula(3)}$$

The compensation module 140 also compensates the pixel values of multiple pixels in each of the segments with the above pixel gain values. In this embodiment, the compensation module 140 calculates the compensated pixel value according to formula (4), wherein the compensated pixel value further includes the compensated red, green, and blue sub-pixel values. In formula (4), r, g, and b respectively represent the original red, green, and blue sub-pixel values of the pixel. Gain represents the pixel gain value. Rout, Gout, and Bout respectively represent the compensated red, green, and blue sub-pixel values.

$$\text{Rout} = r * \text{Gain}$$

$$\text{Gout} = g * \text{Gain}$$

$$\text{Bout} = b * \text{Gain} \quad \text{formula (4)}$$

In the first mode when the chip is applied to the OLED, the target duty cycle is set to 2048. Since the duty cycle value of the first-type segments is greater than 2048, the pixel intensity of the pixels of the first-type segments will also be greater than 2048, so that the pixel gain value is less than 1. In contrast, the duty cycle value of the second-type segments is set to 2048 so that the pixel intensity of the pixels of the second-type segments is also 2048, and the target duty cycle value for the second-type segments is also set to be 2048, so the pixel gain value is equal to 1. Therefore, the pixel values of the pixels of the first-type segments can be reduced, while the pixel values of the pixels of the second-type segments remain unchanged. In this way, by means of pixel compensation, the brightness of multiple pixels in the high-risk first-type segments can be reduced to slow down the premature aging of the light-emitting element and equalize the aging degree of the overall light-emitting elements.

In the second mode when the chip is applied to the LCD, the target duty cycle value is set to 4095, which is the maximum value of the duty cycle value. Therefore, the pixel gain value calculated for pixels with lower pixel intensity is larger. The compensation module 140 can compensate the sub-pixel information of the corresponding pixel with the pixel gain value. In this embodiment, the compensation module 140 can calculate the product of the pixel gain value and the red sub-pixel information, the product of the pixel gain value and the green sub-pixel information, and the product of the pixel gain value and the blue sub-pixel information. The value of the compensated red, green, and blue sub-pixel information becomes larger. In contrast, the pixel gain value calculated for pixels with higher pixel intensity is smaller (still greater than 1), and the value of the compensated red, green, and blue sub-pixel information increases less (compared to pixels with lower pixel intensity). In this way, by compensating the pixels, the contrast of the overall display picture can be improved, and an effect equivalent to local dimming technology can be obtained.

Figure 5:
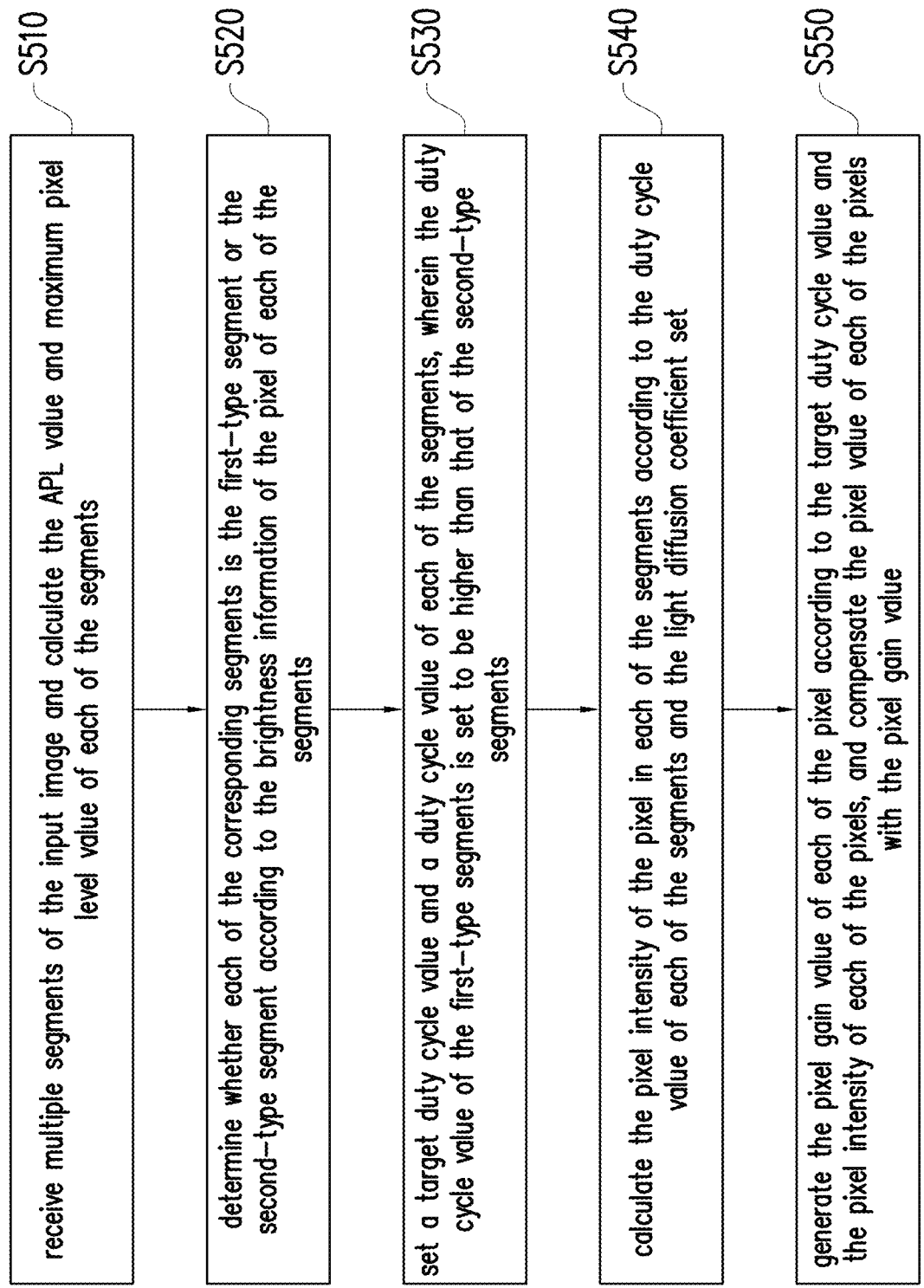
FIG. 5 is a schematic view showing the steps of the image adjustment method in the first mode of the disclosure.

Image FIG. 5 is a schematic view showing the steps of the image adjustment method in the first mode of the disclosure. Please refer to FIG. 5, step S510 is to receive multiple segments of the input image and calculate the APL value and maximum pixel level value of each of the segments. Step S520 is to determine whether each of the corresponding segments is the first-type segment or the second-type segment according to the brightness information of the pixel of each of the segments. Step S530 is to set a target duty cycle value and a duty cycle value of each of the segments, wherein the duty cycle value of the first-type segments is set to be higher than that of the second-type segments. Step S540 is to calculate the pixel intensity of the pixel in each of the segments according to the duty cycle value of each of the segments and the light diffusion coefficient set. Step S550 is to generate the pixel gain value of each of the pixel according to the target duty cycle value and the pixel intensity of each of the pixels, and compensate the pixel value of each of the pixels with the pixel gain value.

Figure 6:
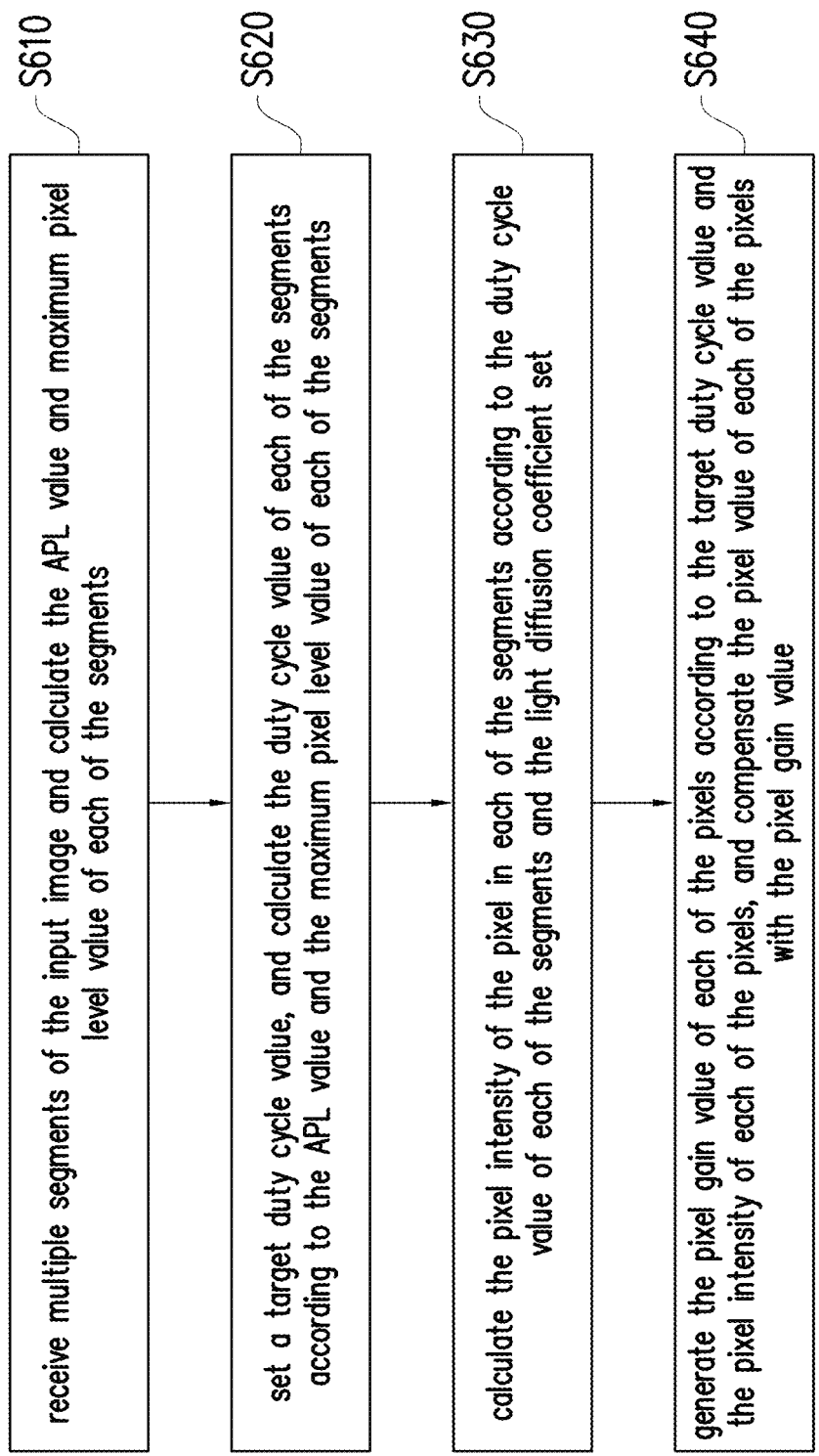
FIG. 6 is a schematic view showing the steps of the image adjustment method in the second mode of the disclosure.

FIG. 6 is a schematic view showing the steps of the image adjustment method in the second mode of the disclosure. Referring to FIG. 6, step S610 is to receive multiple segments of the input image and calculate the APL value and maximum pixel level value of each of the segments. Step S620 is to set a target duty cycle value, and calculate the duty cycle value of each of the segments according to the APL value and the maximum pixel level value of each of the segments, wherein the sum of the maximum pixel level value of the first ratio and the APL value of the second ratio is used as the duty cycle value of the corresponding segment. Step S630 is to calculate the pixel intensity of the pixel in each of the segments according to the duty cycle value of each of the segments and the light diffusion coefficient set. Step S640 is to generate the pixel gain value of each of the pixels according to the target duty cycle value and the pixel intensity of each of the pixels, and compensate the pixel value of each of the pixels with the pixel gain value.

In summary, the image adjustment device of the disclosure can be commonly adopted in LCD and OLED displays to reduce the manufacturing cost of display chip. The image adjustment device may be in the first mode when being applied to an OLED display and in the second mode when being applied to an LCD. The image adjustment device executes multiple modules with different paths in the first mode and the second mode, respectively, such that the pixel value of the pixel of each of the segments is compensated. By compensating pixels, the image adjustment device can exert an effect similar to local dimming (reducing the pixel brightness for segments having higher risk of sticking) when being applied to an OLED display, and can achieve local dimming when being applied to an LCD.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. An image adjustment device suitable for a display, configured to be in a first mode or a second mode according to whether the display is a light emitting diode display or a liquid crystal display, comprising:
  a duty cycle calculator, configured to receive an input image comprising a plurality of segments and:
    in the first mode, determine whether each of the segments is a first-type segment or a second-type segment according to brightness information of each of the segments, and set a duty cycle value of each of the segments according to the respective type of the segments, wherein the first-type segment has a higher risk of sticking than the second-type segment; and
    in the second mode, calculate the duty cycle value of each of the segments according to the brightness information of each of the segments;
  an intensity calculator, coupled to the duty cycle calculator and configured to calculate a pixel intensity of each of the segments according to the duty cycle value of each of the segments and a light diffusion coefficient set; and
  a compensator, coupled to the intensity calculator, and configured to generate a pixel gain value according to a pixel intensity value of each pixel of pixels of the segments, and adjust pixel values of the pixels according the pixel gain values.

2. The image adjustment device according to claim 1, wherein the light diffusion coefficient set is a simulated light diffusion coefficient set in the first mode and is a measured light diffusion coefficient set in the second mode.

3. The image adjustment device according to claim 1, wherein the duty cycle calculator is further configured to set a target duty cycle value, and the compensator is configured to generate the pixel gain values according to the pixel intensity value of each pixel of the pixels of the segments and the target duty cycle.

4. The image adjustment device according to claim 1, wherein each of the brightness information comprises a maximum brightness value and an average brightness value of each of the segments, and the duty cycle calculator takes a sum of the maximum brightness value of a first ratio and the average brightness value of a second ratio as the duty cycle value of each of the segments.

5. The image adjustment device according to claim 1, wherein in the first mode, the duty cycle calculator is further configured to calculate a sum of average brightness values of each of the segments in a plurality of frames, if the sum is greater than a first threshold, the duty cycle calculator determines the segment is the first-type segment, and if the sum is less than or equal to the first threshold, the duty cycle calculator determines the segment is the second-type segment.

6. The image adjustment device according to claim 1, wherein in the first mode, the duty cycle value is a virtual duty cycle value, and
  in the second mode, the duty cycle value is a realistic duty cycle value for controlling a backlight device of the liquid crystal display.

7. The image adjustment device according to claim 1, wherein in the first mode, the duty cycle value of the first-type segment is set to be greater than the duty cycle value of the second-type segment.

8. An image adjustment device suitable for a display, comprising:
  an image detector, configured to receive an input image comprising a plurality of segments, and determine whether each of the segments is first-type segment or a second-type segment according to brightness information of each of the segments, wherein the first-type segment has a higher risk of sticking than the second-type segment;
  a duty cycle setting device, coupled to the image detector and configured to set a duty cycle value of each of the segments in the first mode according to the type of the segments;
  an intensity calculator, coupled to the duty cycle setting device for calculating a pixel intensity of each of the segments according to the duty cycle value of each of the segments and a light diffusion coefficient set; and
  a compensator, coupled to the intensity calculator for generating a pixel gain value according to a pixel intensity value of each pixel of pixels of the segments, and adjusting pixel values of the pixels according to the pixel gain values.

9. The image adjustment device according to claim 8, wherein the light diffusion coefficient set is a simulated light diffusion coefficient set in the first mode and is a measured light diffusion coefficient set in the second mode.

10. An image adjustment device suitable for a display, configured to be in a first mode or a second mode according to whether the display is a light emitting diode display or a liquid crystal display, comprising:
a register circuit, configured to set an operation mode of the image adjustment device to be one of the first mode and the second mode; and
a local dimming module, configured to perform a local dimming process based on an input image comprising a plurality of segments, by calculating a duty cycle value of each of the segments according to pixel values of the segments to compensate the pixel values of each of the segments according to the duty cycle values of the segments and a light diffusion coefficient set,
wherein in the first mode, the duty cycle value is a virtual duty cycle value, and the light diffusion coefficient set is a simulated light diffusion coefficient set, and
in the second mode, the duty cycle value is a realistic duty cycle value for controlling a backlight device of the liquid crystal display, and the light diffusion coefficient set is a measured light diffusion coefficient set.

11. The image adjustment device according to claim 10, wherein the local dimming module comprises a duty cycle calculator configured to calculate the duty cycle value by using different algorithms in the first mode and in the second mode.

12. The image adjustment device according to claim 11, wherein the duty cycle calculator is configured to calculate the duty cycle value by determining whether each of the segments is a first-type segment or a second-type segment according to brightness information of each of the segments, and set a duty cycle value of each of the segments according to the respective type of the segments, wherein the first-type segment has a higher risk of sticking than the second-type segment.

13. The image adjustment device according to claim 12, wherein the duty cycle calculator is configured to set the duty cycle value of the first-type segment to be greater than the duty cycle value of the second-type segment.

14. The image adjustment device according to claim 13, wherein the duty cycle calculator is configured to set a target duty cycle value, and set the duty cycle value of the first-type segment to be greater than the target duty cycle value and set the duty cycle value of the second-type segment to be equal to the target duty cycle value.

15. The image adjustment device according to claim 12, wherein in the first mode, the duty cycle calculator is configured to determine whether each of the segments is the first-type segment or the second-type segment according to respective average picture levels (APLs) of the same segment for a plurality of consecutive frames.

16. The image adjustment device according to claim 15, wherein in the first mode, the duty cycle calculator is configured to determine each of the segments to be the first-type segment when a sum of respective average picture levels (APLs) of the same segment for the consecutive frames is greater than a threshold, and the duty cycle calculator is configured to determine each of the segments to be the second-type segment when the sum is not greater than the threshold.

17. The image adjustment device according to claim 15, wherein in the first mode, the duty cycle calculator is configured to determine whether each of the segments is the first-type segment or the second-type segment according to at least one of an average picture level (APL) and a maximum brightness value of each of the segments.

18. The image adjustment device according to claim 12, wherein the target duty cycle value is configured further to be set in each of the first mode and the second mode, and
wherein the local dimming module further comprises:
an intensity calculator, configured to calculate a pixel intensity of each pixel of the segments according to the duty cycle value of each of the segments and the light diffusion coefficient set in each of the first mode and the second mode; and
a compensator, coupled to the intensity calculator for generating a pixel gain value according to the pixel intensity value of each pixel of the pixels of the segments and the target duty cycle value, and adjusting the pixel value of each pixel according to the pixel gain value of the pixel in each of the first mode and the second mode.

19. The image adjustment device according to claim 18, wherein the target duty cycle value is configured to set the target duty cycle value to be a first value in the first mode and to be a second value greater than the first value in the second mode.

20. The image adjustment device according to claim 18, wherein the pixel gain value is less than 1 for the pixels in the first-type segment and the pixel gain value is equal to 1 for the pixels in the second-type segment.

* * * * *